Oct. 4, 1960 A. HOPTON ET AL 2,954,881
SEPARATION OF ARTICLES FROM A STACK
Filed March 24, 1958 7 Sheets-Sheet 6

Inventors
Alan Hopton and
Brian Goff Howarth
By
Watson, Cole, Grindle & Watson
Attorneys

2,954,881
SEPARATION OF ARTICLES FROM A STACK

Alan Hopton, Stourton, Leeds, and Brian Goff Howarth, Woodkirk, near Dewsbury, England, assignors to The Forgrove Machinery Company Limited, Leeds, England, a company of Great Britain Filed Mar. 24, 1958, Ser. No. 723,561

8 Claims. (Cl. 214—8.5)

It is frequently desired, in the handling of a column of thin flat articles, such for example as biscuits, stacked face to face, to separate automatically a group of articles from the column, e.g. to enable the separated articles to be fed mechanically into a packaging machine.

The thickness of such articles may not be constant, and is frequently not constant in the case of biscuits. Consequently if a fixed length of column is selected for separation, it will often happen that the line of the proposed division does not correspond with the dividing plane between two adjacent articles. Accordingly it is not possible to select a fixed length of column for separation but only a length which may vary from a nominal value by a margin mounting to the thickness of one article.

The invention has for is object to define the point of separation of the column and to ensure separation of a group of articles from the column with minimum damage to the articles.

The invention accordingly provides apparatus for separating a group of thin flat articles, such for example as biscuits, from the leading end of a travelling column of such articles stacked face to face, comprising a dead plate for contact by the edges of the articles as they travel forward, the dead plate including a step leading to a surface for supporting the articles which have travelled beyond the step, side guides for the articles on the dead plate approaching the step, a support for the leading end of the column of articles which is arranged to move with the column, a presser operative, after the leading end of the column has advanced to a datum position, to press at least the first article situated entirely beyond the step into contact with said supporting surface, thereby creating a partial separation between said article and those following it, separating mechanism which is operative to engage the displaced rear surface of said first article and thereafter to establish a gap between the group of articles situated in advance of the step and the following articles and means for returning the movable support to its initial position during or after removal from the column of said group of articles.

The separating mechanism may comprise a first separator arranged first to apply forward pressure to the displaced rear surface of the first article beyond the step and thereby to move it and the preceding articles forward, then to move into the cleavage produced in the column between said article and its successor and finally to move backwards to enlarge the cleavage, a second separator having a front surface aligned with the step and mechanism for moving the second separator into the cleavage to produce at the step a positive separation in the column of articles. In this case the supporting surface beyond the step may be constituted by an extension of the dead plate and the group of articles situated thereon may be removed by an automatically operating cross pusher.

Alternatively, the separating mechanism may comprise a separator, means for actuating the separator to apply forward pressure to the displaced rear surface of the first article beyond the step and thereby establish a gap between said article and its successor, and a second presser arranged to press against the dead plate at least the first of the articles which have not passed beyond the step and the apparatus may include an intermittently operating conveyor for receiving each group of articles as it travels beyond the step and thereafter removing it in a direction transverse to the length of the column after establishment by the separating mechanism of the gap in the column of articles. In this case the separating surface beyond the step may be constituted by the bottom surface of the pocket of a conveyor of the construction described in British specification No. 684,254.

Preferably the dead plate is disposed horizontally and the articles are urged forwardly on to the dead plate and into contact with the movable support by a suitable conveyor, e.g., a driven belt or belts frictionally engaging some of the articles in the column. As an alternative, however, the dead plate may be disposed vertically, in which case the articles may be fed by gravity towards the movable support, or it may be disposed at any desired angle to the vertical and horizontal.

Three alternative forms of biscuit handling apparatus according to the invention will now be described in detail, by way of example, with reference to the accompanying drawings, in which.

Like reference numerals indicate like parts throughout the figures.

In the case of the apparatus shown in Figs. 1–6, a column of biscuits 11 (Fig. 2) standing on edge is advanced along a horizontal dead plate 12 between side guides 13 (Fig. 1) by an intermittently moving conveyor constituted by belts 14. The belt conveyor has a driving drum 15 which is intermittently driven, from a continuously running chain drive 16, by an electro-magnetically controlled friction clutch 17. The dead plate 12 has a vertical step 18, beyond which is a horizontal surface 19 at a lower level than the dead plate 12. The leading end of the column of biscuits abuts against a movable support plate 20 which is slidable on a rod 21 and is moved forward by the biscuits as they are slid forward along the dead plate 12 and down on to the surface 19 by pressure from the biscuits supported on the moving belts 14.

The apparatus includes a cam shaft 22 which is intermittently driven from a constantly running chain drive 23 by an electro-magnetically controlled dog clutch 24. On the cam shaft 22 are a cam 25, controlling a linkage 26 for imparting vertical movement to a forked separator 27; a cam 28 controlling a linkage 29 for reciprocating on the rod 21 a slide 30 for returning the movable support 20; cams 31, 32 which operate through linkages 33, 34 to impart respectively horizontal and vertical movements to a cracking bar 35 and a cam 36 which operates through a linkage 37 to impart up and down movement to a presser 38. The cam shaft 22 is geared by bevel gears 39 to another cam shaft 40, carrying cams 41, 42 which operate through linkages 43, 44 on a cross pusher 45.

Figure 1:
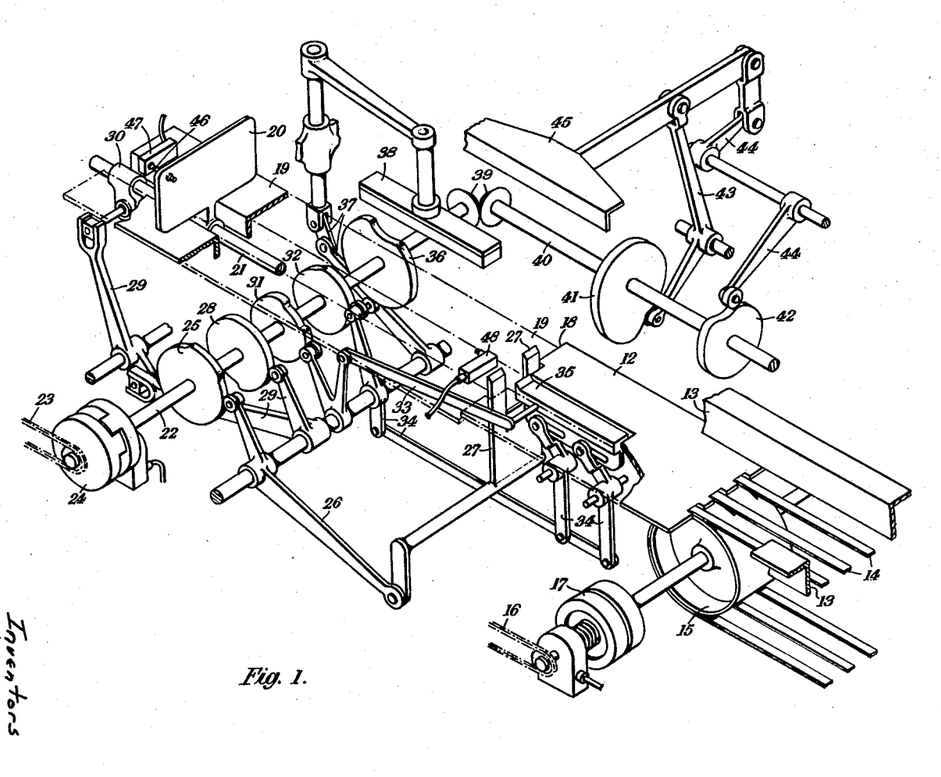
Fig. 1 is a diagrammatic perspective view of the first form of apparatus.
Figure 2:
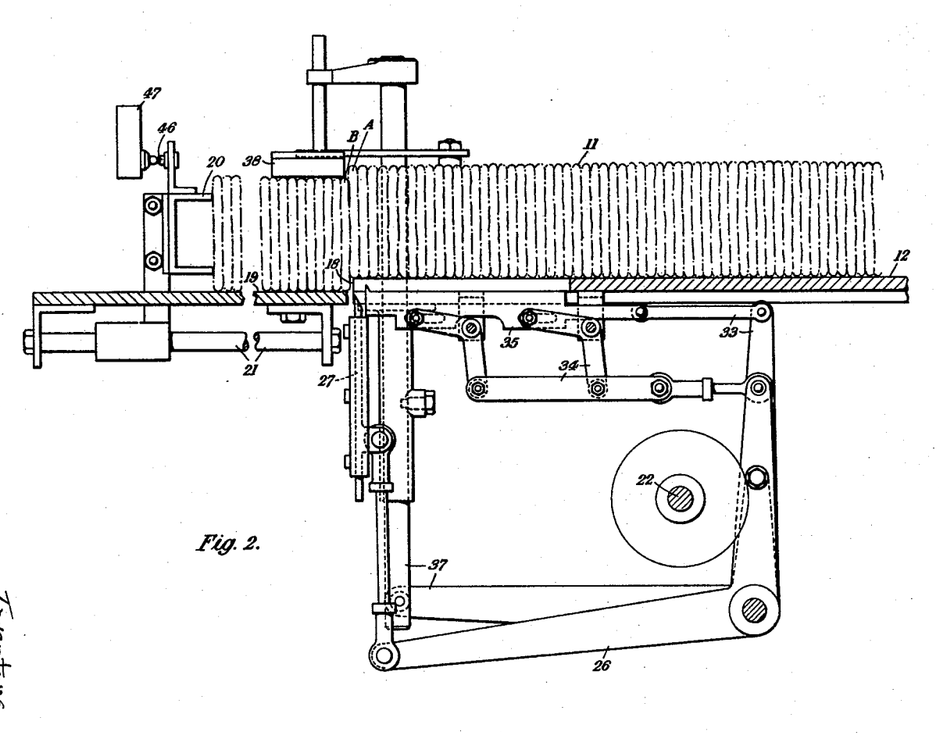
Fig. 2 is a longitudinal section through part of the apparatus shown in Fig. 1, but modified in regard to details of certain linkages.

Forward movement of the biscuits 11 along the dead plate 12 continues until a projection 46 on the support plate 20 actuates a microswitch 47. This, as will shortly be explained with reference to the circuit diagram in Fig. 6, results in disengagement of the friction clutch 17, thereby stopping the feed belts 14, and engagement of the dog clutch 24, thereby causing the cam shaft 22 to rotate. The cam 36 then causes the presser 38 to operate and cams 31, 32 and 25 cause the cracking bar 35 and separator 27 to provide separation between the biscuits on the supporting surface 19 and those on the dead plate 12, all as described in detail later, whereafter the cams 41 and 42 cause the cross pusher 45 to move transversely off the surface 19 the group of biscuits supported thereon. The cam 28 causes the slide 30 to return the support plate 20 to the right as shown in Figs. 1 and 2. When the support plate 20 reaches a position near the leading biscuit remaining on the dead plate 12, it actuates another microswitch 48, thereby re-engaging the friction clutch 17 and setting the belts 14 in motion again. The dog clutch 24 driving the cam shaft 22 becomes disengaged automatically after the cam shaft 22 has completed one revolution. The cycle of operations is then repeated. The microswitch 47 is adjustable in position, so enabling the stroke of the support plate 20 to be varied and thereby permitting of adjustment of the length of the stack of biscuits which will be fed on to the support 19 at each cycle of operation of the feed belts.

Figure 6:
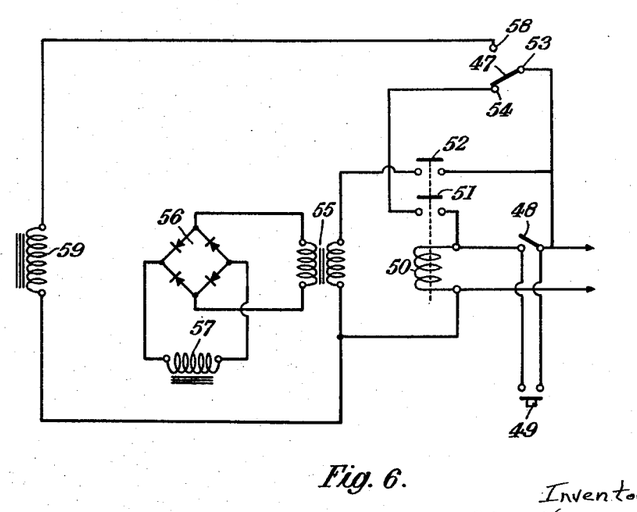
Fig. 6 is a circuit diagram.

Referring to the circuit diagram shown in Fig. 6, it will be seen that when contacts 49, operated by the machine starter button are closed, a relay 50 is energised, thereby closing normally open contacts 51, 52. The contact 51 then establishes a holding circuit for the relay 50 through the normally closed contacts 53, 54 of the microswitch 47, while the contact 52 completes a circuit to energise, through a transformer 55 and a rectifier 56, the coil 57 of the friction clutch 17, thereby engaging the friction clutch to drive the feed belts 14. As soon as the support plate 20 engages the microswitch 47, the latter changes over to bridge contacts 53 and 58, thereby de-energising the relay 50 and causing the contact 52 thereof to move to position to de-energise the coil 57 and cause disengagement of the friction clutch 17. Bridging of the contacts 53, 58 by the microswitch 47 energises a coil 59, thereby engaging the one-revolution dog clutch 24. This remains engaged, notwithstanding subsequent de-energization of the coil 59, which takes place as the result of the microswitch 47 returning to its original position as soon as the support plate 20 is moved away from it by the slide 30, until the cam shaft 22 has completed one revolution and then disengages automatically. When the support plate 20 has completed its return stroke it causes the microswitch 48 to move to its alternative position, thereby re-energising the relay 50 and the coil 57 of the friction clutch 17. The relay 50 is maintained energised by the above-described holding circuit notwithstanding the fact that the microswitch 48 moves back to the position illustrated as soon as the support plate 20 is moved away from it by the advancing biscuits.

In the arrangement shown in the circuit diagram, the dog clutch 24 is automatically engaged by the electrical impulse received from the coil 59 and remains engaged until it is automatically disengaged by mechanical means when it has completed a revolution. It will be appreciated, however, that the dog clutch could if desired be both engaged and disengaged electrically by an associated relay and holding circuit in similar fashion to the friction clutch.

Soon after the cam shaft 22 has been set in motion as the result of the support plate 20 contacting the microswitch 47, the presser 38, which is spring-loaded so that it exerts a gentle action on the biscuits, is moved down by the cam 36 into the position shown in Fig. 2. This ensures that the biscuits immediately in advance of the step 18 will be pressed down until their undersurfaces are in contact with the surface 19 at the lower level. The immediately following biscuit A remains at the higher level. Consequently a partial separation has been effected in the column of biscuits which corresponds approximately with the step 18.

At this juncture one of two conditions may apply. The two conditions are:

(1) The line of partial separation corresponds with the vertical face of the step 18.

(2) As will be more usual, the line of partial separation is some distance away from the step 18 due to the immediately following article A overhanging by part of its thickness beyond the step.

Figure 3:
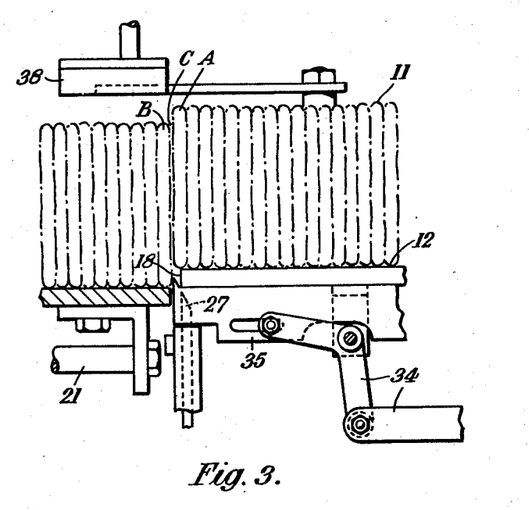
Figs. 3–5 are views similar to Fig. 2 showing successive stages in the operation of effecting separation of the leading biscuits from the remainder of the column.

Irrespective of conditions, after the presser 38 has been moved up again the cracking bar 35 is now moved forward horizontally by its cam 31, as shown in Fig. 3, at a level parallel to and between that of the dead plate 12 and that of the surface 19. As it moves forward the cracking bar 35 presses gently against the rear face of the biscuit B immediately in advance of the step 18. A small cleavage C is accordingly formed immediately above the point of contact of the cracking bar 35 with the biscuit B. This point is also a natural parting plane of the biscuits.

Figure 4:
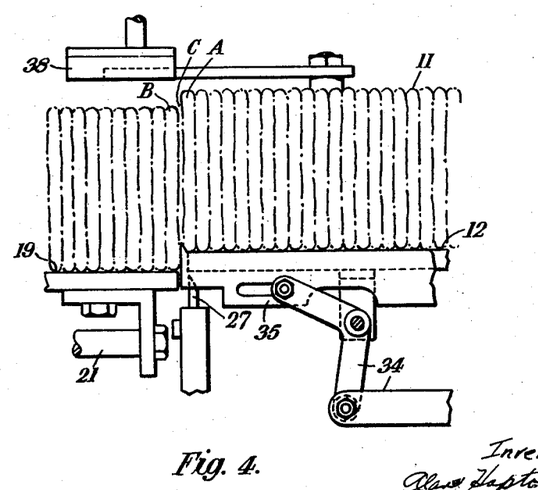

The cracking bar 35 is then moved vertically upwards by its cam 32, as shown in Fig. 4, to insert its lip into this cleavage C and rises to a level slightly above that of the dead plate 12, thus returning the biscuit A, which projects over the step and which may have been slightly depressed, back to the high level.

Figure 5:
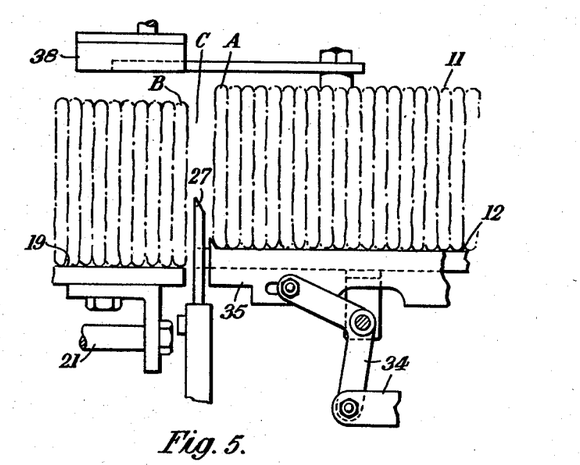

The cracking bar 35 is then moved rearwardly by its cam 31 to the position shown in Fig. 5 to enlarge the cleavage C.

The separator 27, which is positioned with one face in line with the vertical face of the step 18 and which straddles the cracking bar 35 as clearly shown in Fig. 1, is then moved vertically upwards by its cam 25 into the enlarged cleavage C, as shown in Fig. 5, thus forming a positive separation in the column of the biscuits in line with the vertical face of the step 18.

The group of biscuits on the surface 19 is now separated from the remainder of the column in a defined position and the cross pusher 45 is now moved to the left, as seen in Fig. 1, by the cam 41 to move laterally out of the path of the column of biscuits remaining on the dead plate 12 the group of biscuits on the surface 19. On its return stroke, the pusher 45 is lifted by the cam 42 to a position clear of the returning support plate 20.

Figure 7:
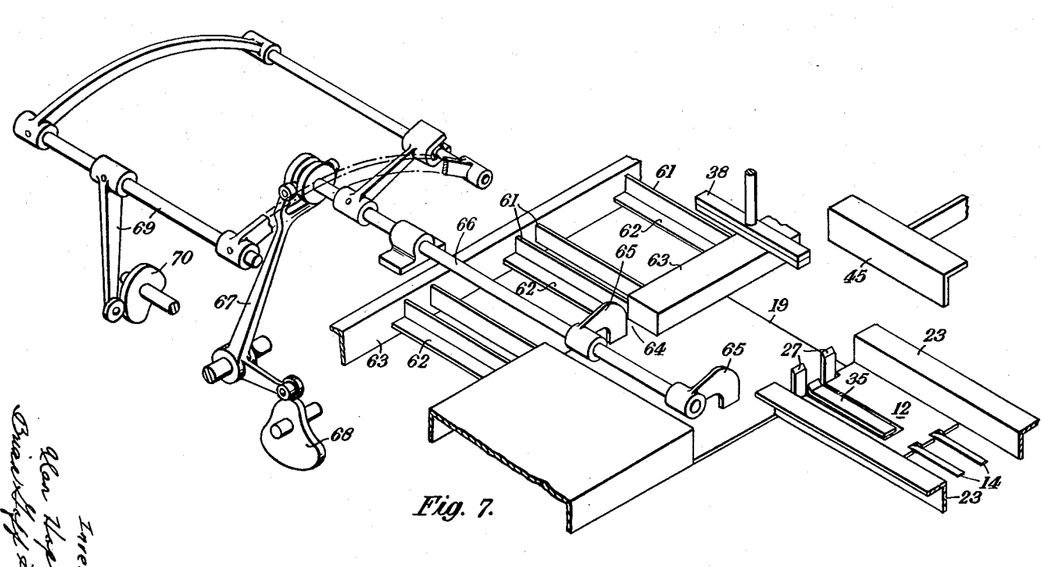
Fig. 7 is a diagrammatic perspective view of the second form of apparatus.

Fig. 7 shows a modified mechanism whereby the groups of biscuits which are removed by the cross pusher 45 from the path of the biscuits on the dead plate 12 are transferred mechanically and in succession to the pockets of an intermittently moving conveyor for conveying the biscuits to a wrapping machine. This conveyor, which is of the construction described in British specification No. 684,254, comprises a series of pockets, each comprising a pair of end members 61 having inturned flanges 62 to support the biscuits. These pockets are mounted on intermittently moving chains, not shown, and feed the groups of biscuits to the wrapping machine between side guides 63.

Each group of biscuits, after displacement to the left from position in front of the separator 27, is fed endwise into a pocket of the conveyor 60 through a gap 64 in the nearer side guide 63 by a pair of fingers 65 on a rod 66. The rod 66 receives reciprocating movement through a linkage 67 actuated by a cam 68 to move the biscuits into the pocket of the conveyor 60 dwelling opposite the gap 64. The rod 66 is then rocked through a linkage 69 actuated by a cam 70 to lift the fingers 65 clear of the biscuits. During the return movement of the rod 66 the fingers are returned to the operative position shown.

Figure 8:
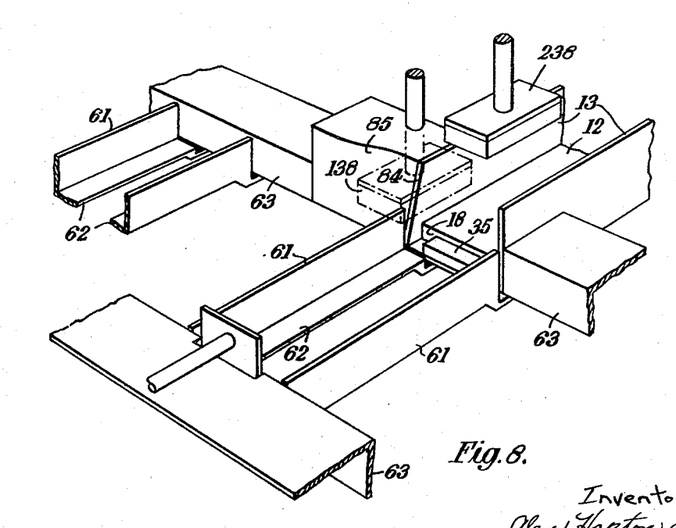
Fig. 8 is a diagrammatic perspective view of the third form of apparatus.
Figure 9:
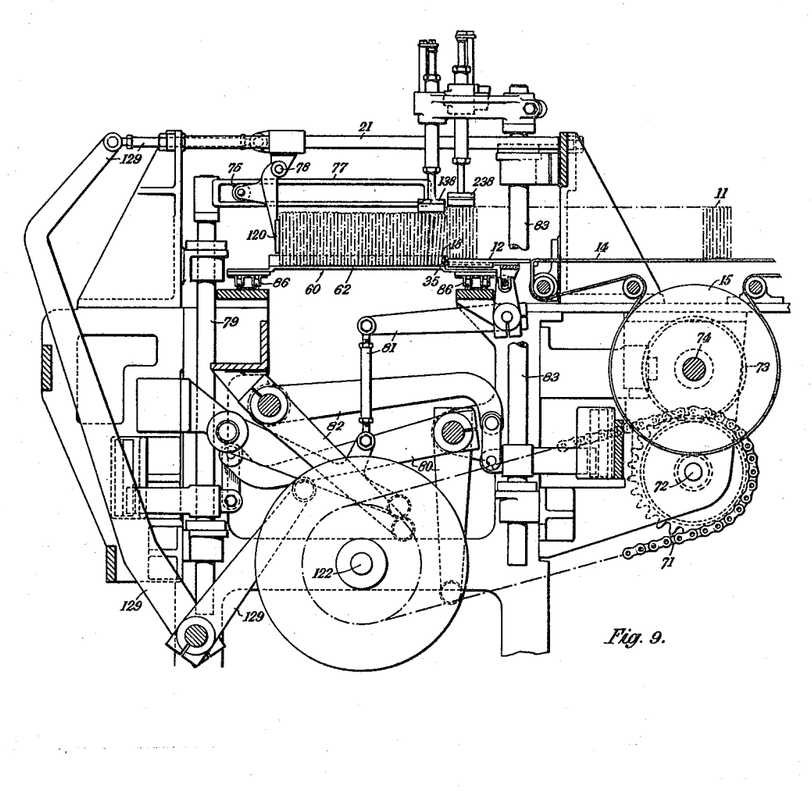
Fig. 9 is a longitudinal section through the apparatus shown in Fig. 8.
Figure 10:
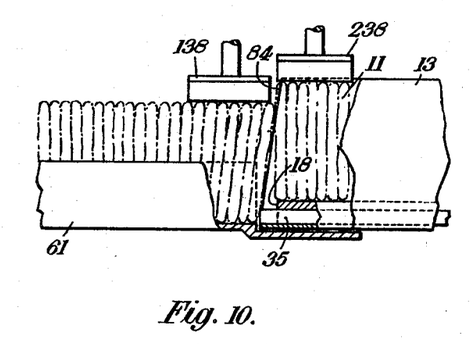
Fig. 10 is a detail view, on a larger scale, of part of the apparatus shown in Fig. 8.

In the case of the modified and simpler mechanism shown in Figs. 8–10 the biscuits are fed directly over the step 18 of the dead plate 12 onto a surface at a lower level defined by the inturned flanges 62 of the pockets of an intermittently moving conveyor 60 similar to that shown in Fig. 7. The chains 86 for imparting intermittent movement to the conveyor 60 are shown in Fig. 9.

In this case the cam shaft 122 rotates continuously and drives through a chain 71 a shaft 72 driving a gear wheel 73 on a shaft 74 carrying the drum 15 for driving the feed belts 14. The gear wheel 73 is periodically clutched to the shaft 74 to cause the feed belts 14 to be driven by an electromagnetically controlled clutch (not shown) which is engaged to drive the feed belts during the appropriate part of the cycle of revolution of the cam shaft 122 under control of a switch (not shown) operated by a cam on the cam shaft.

The support plate 120 is moved positively both on its outward and on its return stroke by a linkage 129 actuated by a cam on the cam shaft and carries a roller 75 running in a slot 76 in a horizontal guide bar 77. The support plate 120 is pivoted by a pin 78 to its actuating linkage, and during the return stroke of the support plate, the bar 77 is lifted by a rod 79 and cam-operated linkage 80, so rocking the support plate 120 clockwise about the pin 78 into a position clear of the biscuits contained in the pocket of the conveyor 60.

The separator is dispensed with and the cracking bar 35 receives a horizontal movement only through a linkage 81 actuated by a cam on the cam shaft 122. Each of the two pressers 138, 238 is actuated by an individual linkage and rod from a cam on the cam shaft, the linkage 82 and rod 83 for the presser 138 being shown in Fig. 9.

When the support plate 120 has completed its outward stroke, the clutch is disengaged to interrupt the drive to the feed belts 14. The pressers then descend, as shown most clearly in Fig. 10. The front presser 138 presses the biscuits immediately in advance of the step 18 down into firm contact with the base of the pocket in the conveyor 60, while the presser 238 maintains control of the biscuits immediately to the rear of the step 18. The cracking bar 35 is then moved forwardly slightly through a slot formed in the step 18 as indicated in Figs. 8 and 10. The rear side guide 13 has a relieved edge 84, shown in Fig. 8, which allows the upper ends of the biscuits to tilt backwardly to a slight extent as shown in Fig. 10. The conveyor then commences to move, towards the left as shown in Fig. 8, and during this movement a plough guide 85 returns the biscuits in the conveyor pocket to a vertical position.

What we claim as our invention and desire to secure by Letters Patent is:

1. Apparatus for separating in succession groups of biscuits or like thin articles from the leading end of a traveling column of such articles stacked face to face, comprising a dead plate, said dead plate including a step leading to a surface for supporting the articles which have traveled beyond said step, feeding means for intermittently feeding said articles forward along the dead plate, a support for the leading end of said column of articles which is arranged to move with said articles as they travel forwards, means for stopping said feeding means when said support has traveled a predetermined distance, a pusher operative after stoppage of said feeding means to push the articles immediately in advance of the step into contact with said supporting surface, a separator located at the level of said step and normally situated behind it, means for periodically actuating said separator to apply forward pressure to a portion situated immediately in advance of the step of the rearmost of said displaced articles, means for thereafter removing laterally from the column the group of articles in advance of the separator, means for returning the support into contact with the articles remaining in the column and means for restarting said feeding means.

2. Apparatus for separating in succession groups of biscuits or like thin articles from the leading end of a traveling column of such articles stacked face to face, comprising a dead plate, said dead plate including a step leading to a surface for supporting the articles which have traveled beyond said step, a feed conveyor for feeding said articles on to and along said dead plate, an electromagnetically controlled clutch for driving said feed conveyor, a support for the leading end of said column of articles which is arranged to move with said articles as they travel forward, a first switch operable by said support when it has traveled forward a predetermined distance to disengage said clutch, a second switch operable by said support on return movement thereof to position adjacent the step to engage said clutch, a pusher operative to push the articles immediately in advance of the step into contact with said supporting surface, a separator operative to apply forward pressure to the rearmost of said displaced articles, means for periodically removing laterally from the column the group of articles in advance of said separator, cams for respectively actuating said pusher, said separator and said removing means, and for imparting return movement to said support, and an electromagnetically controlled clutch operable by said first switch to impart a cycle of revolution to said cams.

3. Apparatus for separating in succession groups of biscuits or like thin articles from the leading end of a traveling column of such articles stacked face to face, comprising a horizontal dead plate having a step, a pocket conveyor extending transversely to said dead plate beyond said step, feeding means for periodically feeding said articles forward along the dead plate, a support for the leading end of said column of articles which is arranged to move with said articles as they travel forward, means for stopping said feeding means when said support has traveled a predetermined distance, a pusher operative after stoppage of said feeding means to push the articles immediately in advance of the step into contact with the bottom of a pocket of said conveyor, a separator, means for actuating said separator to apply forward pressure to the rearmost of said displaced articles, means for moving said conveyor intermittently forward to withdraw from said column in succession groups of articles which have been fed forward by said separator, means for returning the support into contact with the articles remaining in the column and means for restarting said feeding means.

4. Apparatus as claimed in claim 3, which includes side guides shaped to allow the articles to tilt rearwardly as they are pushed forward by the separator and a stationary plough guide adjacent said conveyor for restoring the articles to an erect position as they are traversed past the plough guide on movement of the conveyor.

5. Apparatus as claimed in claim 3, which includes a second pusher operable to press against the dead plate the articles immediately behind the step during operation of the separator.

6. Apparatus for separating in succession groups of biscuits or like thin articles from the leading end of a traveling column of such articles stacked face to face, comprising a horizontal dead plate having a step, a pocket conveyor extending transversely to said dead plate beyond said step, a feed conveyor for feeding said articles onto and along said dead plate, an electromagnetically controlled clutch for driving said feed conveyor, a support for the leading end of said column of articles which is arranged to move with said articles as they travel forward, a first switch operable by said support when it has traveled forward a predetermined distance to disengage said clutch, a second switch operable by said support on return movement thereof to position adjacent the step to engage said clutch, a pusher operative to push the articles immediately in advance of the step into contact with the bottom of a pocket of said conveyor, a separator operative to apply forward pressure to the rearmost of said displaced articles, cams for respectively actuating said pusher and said separator, another cam for imparting forward and return strokes to said support and an electromagnetically controlled clutch operable by said first switch to impart a cycle of revolution to said cams.

7. Apparatus as claimed in claim 6, comprising a further cam operative to lift the support out of the path of the articles on the pocketed conveyor during the return stroke of said support.

8. Apparatus for separating in succession groups of biscuits or like thin articles from the leading end of a travelling column of such articles stacked face to face, comprising a dead plate, said dead plate including a step leading to a surface for supporting the articles which have travelled beyond said step, feeding means for periodically feeding said articles forward along the dead plate, a support for the leading end of said column of articles, which is arranged to move with said articles as they travel forwards, means for stopping said feeding means when said support has travelled a predetermined distance, a pusher operative after stoppage of said feeding means to push the articles immediately in advance of the step into contact with said supporting surface, a separator, means for actuating said separator to apply forward pressure to the rearmost of said displaced articles, means for moving said separator rearwardly, after it has moved forward, to produce an enlarged cleavage between the group of articles in advance of the step and the succeeding articles, a second separator having a front surface aligned with said step, means for moving said second separator into said enlarged cleavage, means for thereafter removing laterally from the column the group of articles in advance of the separator, means for returning the support into contact with the articles remaining in the column and means for restarting said feeding means.

References Cited in the file of this patent
UNITED STATES PATENTS

| | | |
|---|---|---|
| 1,269,115 | Reese | June 11, 1918 |
| 1,402,223 | Fogde et al. | Jan. 3, 1922 |
| 1,818,496 | Milmoe | Aug. 11, 1931 |
| 1,843,453 | Littlefield | Feb. 2, 1932 |
| 2,152,970 | Ness | Apr. 4, 1939 |
| 2,315,670 | Tascher et al. | Apr. 6, 1943 |
| 2,619,217 | Merrill | Nov. 25, 1952 |
| 2,697,236 | McCain | Dec. 21, 1954 |
| 2,703,182 | Broberg | Mar. 1, 1955 |